(12) United States Patent
Tozaki et al.

(10) Patent No.: US 8,517,881 B2
(45) Date of Patent: Aug. 27, 2013

(54) MICRO-TRACTION DRIVE

(75) Inventors: Yasuyoshi Tozaki, Tokyo (JP); Takeshi Yoshimi, Tokyo (JP); Isamu Shiotsu, Tokyo (JP); Hiroyuki Sonobe, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/142,388

(22) PCT Filed: Aug. 18, 2010

(86) PCT No.: PCT/JP2010/063944
§ 371 (c)(1),
(2), (4) Date: Jun. 27, 2011

(87) PCT Pub. No.: WO2011/070823
PCT Pub. Date: Jun. 16, 2011

(65) Prior Publication Data
US 2011/0269594 A1  Nov. 3, 2011

(30) Foreign Application Priority Data
Dec. 10, 2009 (JP) ................................ 2009-280789

(51) Int. Cl.
*F16H 13/08* (2006.01)
(52) U.S. Cl.
USPC ........................................................ 475/183
(58) Field of Classification Search
USPC ................... 475/183, 149, 346, 196
See application file for complete search history.

(56) References Cited

U.S. PATENT DOCUMENTS

| | | | | |
|---|---|---|---|---|
| 1,585,140 A * | 5/1926 | Erban | ............................ | 475/195 |
| 3,041,893 A * | 7/1962 | Johnson | ......................... | 475/196 |
| 2005/0064977 A1* | 3/2005 | Oishi | ............................ | 475/183 |
| 2009/0075775 A1* | 3/2009 | Tozaki et al. | .................. | 475/185 |

FOREIGN PATENT DOCUMENTS

| | | |
|---|---|---|
| JP | 61-197840 A | 9/1986 |
| JP | 62-88865 A | 4/1987 |
| JP | 07158709 A * | 6/1995 |

(Continued)

OTHER PUBLICATIONS

Japanese Decision to Grant a Patent issued in Japanese Patent Application No. 2009-280789 on Feb. 26, 2013.

(Continued)

*Primary Examiner* — David D Le
*Assistant Examiner* — Lillian Nguyen
(74) *Attorney, Agent, or Firm* — Birch, Stewart, Kolasch & Birch, LLP

(57) ABSTRACT

A micro-traction drive includes an inner ring formed rotatably supported about an axis; an outer ring having a larger diameter than the inner ring; rolling elements rolling while being in contact with an outer circumferential surface of the inner ring and an inner circumferential surface of the outer ring; a retaining portion that keeps the rolling elements apart from one another; a pressing portion that applies a preload between the inner ring and the rolling elements and between the outer ring and the rolling elements; and an input shaft that is formed to have a smaller diameter than the inner circumferential surface of the inner ring, is disposed adjacent to the inner ring, and transmits a rotational driving force to the inner circumferential surface of the inner ring. One of the outer ring and the retaining portion is connected to the output shaft, and the other thereof is fixed.

2 Claims, 9 Drawing Sheets

(56) References Cited

FOREIGN PATENT DOCUMENTS

| | | |
|---|---|---|
| JP | 9-89065 A | 3/1997 |
| JP | 11-72152 A | 3/1999 |
| JP | 2004-116670 A | 4/2004 |
| JP | 3659925 A | 6/2005 |
| JP | 2006-77885 A | 3/2006 |
| JP | 2007-205396 A | 8/2007 |

OTHER PUBLICATIONS

European Search Report issued in European Patent Application No. 10835745.0 on May 14, 2013.

* cited by examiner

MICRO-TRACTION DRIVE

BACKGROUND OF THE INVENTION

1. Field of the Invention

The present invention relates to a micro-traction drive that can be accommodated in a small apparatus, is less likely to be damaged, and can provide a large reduction ratio and a high torque.

2. Description of the Related Art

A small apparatus that has a rotational driving source, such as a motor, and rotationally drives a working portion at the tip, such as a small drilling apparatus for soil survey or a turbine-rotor center core replica sampling apparatus, needs to have a micro-traction drive provided therein, which transmits a reduced rotation speed.

Accordingly, various configurations of micro-traction drives have been proposed (for example, see PTLS 1 and 2).

Because micro-traction drives are adapted from roller bearings, they are known to have features of low manufacturing cost, low noise, and low vibration, compared with traction drives using gears.

CITATION LIST

Patent Literature

{PTL 1} Japanese Unexamined Patent Application, Publication No. Hei 9-89065
{PTL 2} the Publication of Japanese Patent No. 3659925

SUMMARY OF INVENTION

Technical Problem

It is known that the ratio of the inner ring to the outer ring of the bearing to be used determines the reduction ratio per stage of the above-described micro-traction drives adapted from roller bearings. More specifically, there has been a problem in that the micro-traction drives have a reduction ratio per stage of approximately 2.5, which is not large compared with traction drives using gears.

To solve this problem, a method in which two micro-traction drives are connected to form a two-stage configuration, thereby increasing the overall reduction ratio has been proposed.

However, connecting two micro-traction drives increases the number of components and makes assembly thereof complex, leading to problems of increased manufacturing cost of micro-traction drives and loss of an advantage of low manufacturing cost.

The present invention has been made to solve the above-described problems, and an object thereof is to provide a micro-traction drive that produces low noise and low vibration compared with a traction drive using gears, that has an increased reduction ratio, and that can be produced at low manufacturing cost.

Solution to Problem

To achieve the above-described object, the present invention provides the following solutions.

A micro-traction drive of the present invention includes an inner ring that is formed in a cylindrical shape and is supported so as to be rotatable about a rotation axis; an outer ring that is formed in a cylindrical shape and has a larger diameter than the inner ring; a plurality of rolling elements that roll while being in contact with the outer circumferential surface of the inner ring and the inner circumferential surface of the outer ring; a retaining portion that keeps the plurality of rolling elements apart from one another at predetermined intervals; a pressing portion that applies a preload between the inner ring and the rolling elements and between the outer ring and the rolling elements; and an input shaft formed to have a smaller diameter than the inner circumferential surface of the inner ring, the input shaft being disposed adjacent to the inner ring and transmitting a rotational driving force to the inner circumferential surface of the inner ring. One of the outer ring and the retaining portion is connected to the output shaft, and the other thereof is fixed.

According to the present invention, by transmitting a rotational driving force to the inner ring from the input shaft disposed adjacent to the inner circumferential surface of the inner ring, a large reduction ratio can be achieved even with a traction drive adapted from a roller bearing.

That is, because of the inner ring, the rolling elements, the retaining portion, and the outer ring, a predetermined reduction ratio is achieved by a traction drive adapted from a roller bearing, and a certain reduction ratio is achieved also between the inner ring and the input shaft. As a result, the micro-traction drive of the present invention can achieve a large reduction ratio without connecting two roller bearings but using one roller bearing.

For example, when the retaining portion is connected to the output shaft, and the outer ring is fixed, a reduction ratio of (D1/d)×(D2/D1+1) can be achieved. Alternatively, when the outer ring is connected to the output shaft, and the retaining portion is fixed, a reduction ratio of D2/d can be achieved.

Herein, D1 is the diameter of the inner circumferential surface of the inner ring, D2 is the diameter of the inner circumferential surface of the outer ring, and d is the diameter of the input shaft.

In addition, the micro-traction drive of the present invention can be produced using a commercially available cylindrical roller bearing or deep groove ball bearing.

In the above invention, it is preferable that the input shaft be formed in a cylindrical shape having a smaller diameter than the inner circumferential surface of the inner ring, the inner circumferential surface of the inner ring be formed in a cylindrical surface shape, and the pressing portion apply a preload between the inner ring and the rolling elements and between the outer ring and the rolling elements by pressing the input shaft against the inner circumferential surface of the inner ring.

With this configuration, even if a rotational driving force is transmitted between the input shaft and the inner ring, noise can be reduced, moreover vibration can be reduced, compared with transmission using gears.

In addition, because the pressing portion presses the input shaft against the inner circumferential surface of the inner ring, in other words, presses the input shaft radially outward of the inner ring, slip or the like between the input shaft and the inner ring can be prevented. At the same time, slip or the like between the inner ring and the rolling elements, as well as between the outer ring and the rolling elements, can also be prevented.

In the above invention, it is preferable that the input shaft be formed in the shape of a circular truncated cone having a smaller diameter than the inner circumferential surface of the inner ring, the inner circumferential surface of the inner ring be formed in the shape of a circumferential surface of a circular truncated cone, and the pressing portion apply a preload between the inner ring and the rolling elements and between the outer ring and the rolling elements by pressing the input shaft along the rotation axis of the input shaft from a large-diameter side to a small-diameter side of the circular truncated cone.

With this configuration, even if a rotational driving force is transmitted between the input shaft and the inner ring, noise can be reduced, moreover vibration can be reduced, compared with transmission using gears.

In addition, because the pressing portion presses the input shaft along the rotation axis of the input shaft, from the large-diameter side to the small-diameter side of the circular truncated cone, slip or the like between the input shaft and the inner ring can be prevented. At the same time, slip or the like between the inner ring and the rolling elements, as well as between the outer ring and the rolling elements, can also be prevented.

Advantageous Effects of Invention

The micro-traction drive of the present invention provides advantages in that, by using a bearing formed of an inner ring, an outer ring, and rolling elements and by using an input shaft having a smaller diameter than the inner ring, low noise and low vibration can be achieved compared with a traction drive using gears, and the reduction ratio can be increased while reducing the manufacturing cost.

DESCRIPTION OF EMBODIMENTS

First Embodiment

A micro-traction drive according to a first embodiment of the present invention will be described below with reference to FIGS. 1 to 3.

Figure 1:
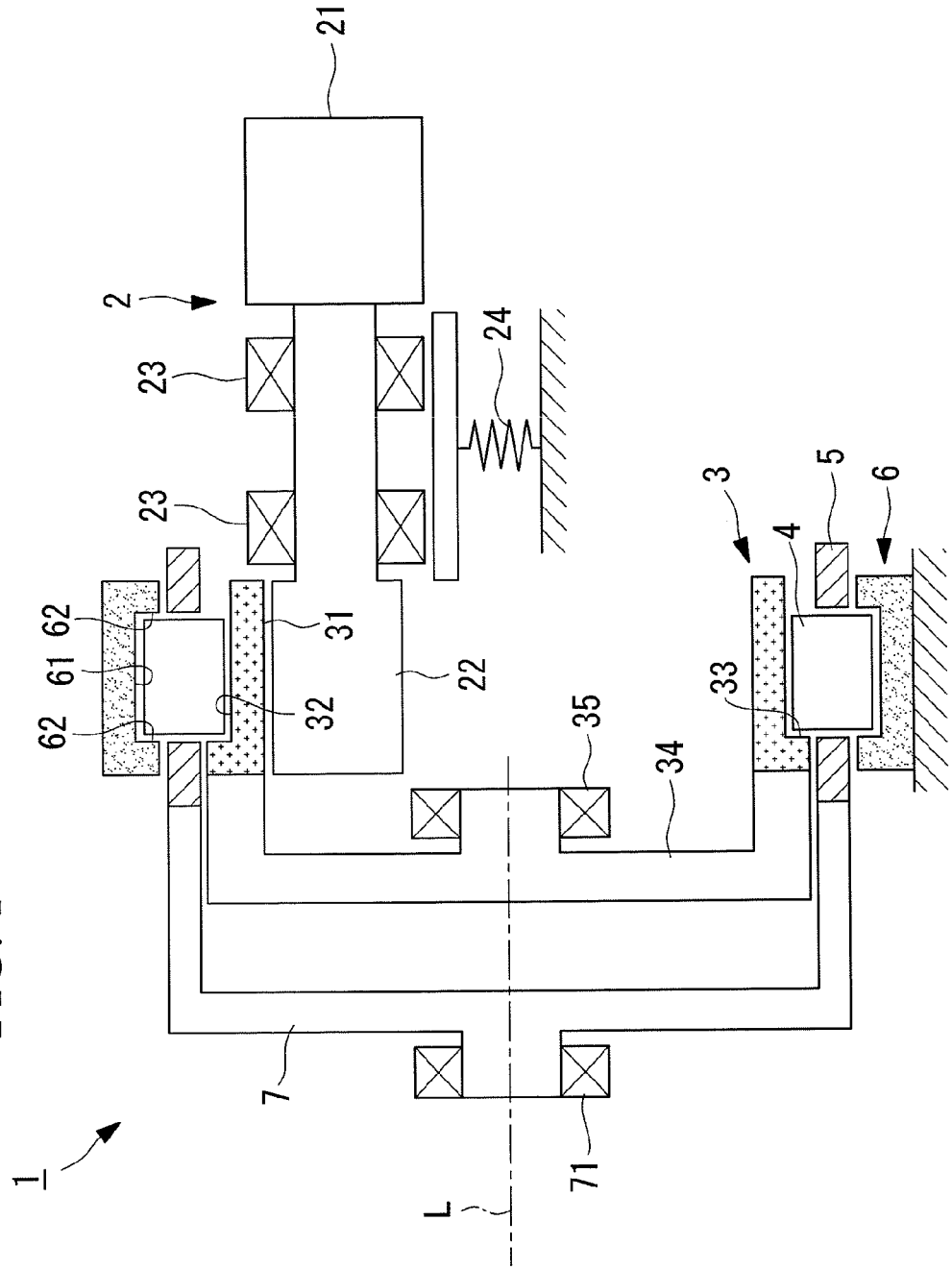
FIG. 1 is a schematic view for describing the configuration of a micro-traction drive according to a first embodiment of the present invention.

FIG. 1 is a schematic view for describing the configuration of a micro-traction drive according to this embodiment. FIG. 2 is a schematic view for describing the positional relationship of an outer ring, a cylindrical roller, an inner ring, and an input roller in FIG. 1.

In this embodiment, an application of the present invention to a micro-traction drive 1 used for transmitting a rotational driving force in a small reducer or a steering device will be described.

Figure 2:
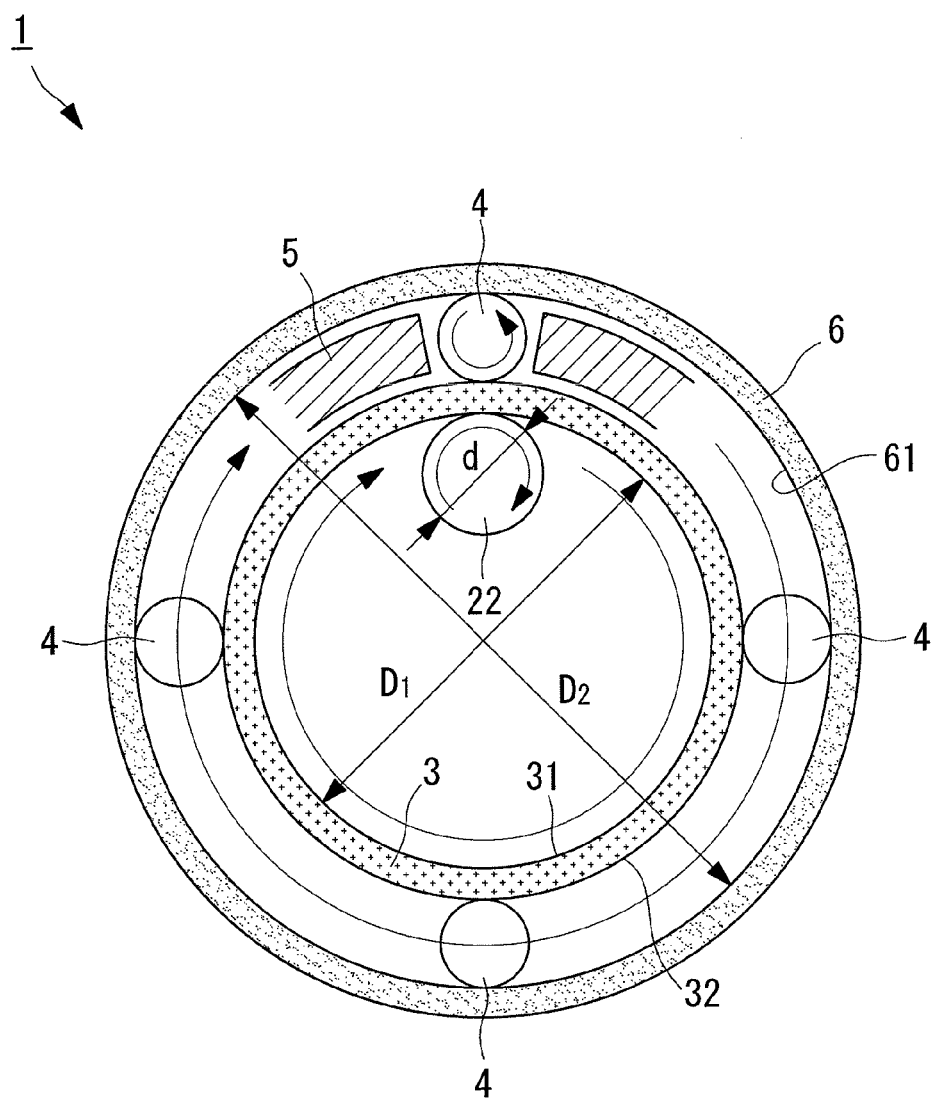
FIG. 2 is a schematic view for describing the positional relationship of an outer ring, a cylindrical roller, an inner ring, and an input roller in FIG. 1.

As shown in FIGS. 1 and 2, the micro-traction drive 1 mainly includes an input unit 2, an inner ring 3, cylindrical rollers (rolling elements) 4, a retainer (retaining portion) 5, an outer ring 6, and an output shaft 7.

The input unit 2 inputs a rotational driving force to the inner ring 3 of the micro-traction drive 1 and is disposed adjacent to an inner circumferential surface 31 of the inner ring 3.

The input unit 2 mainly includes a motor 21, an input roller (input shaft) 22, input bearings 23, and a pressing portion 24.

The motor 21 generates a rotational driving force and rotationally drives the inner ring 3 via the input roller 22.

The motor 21 may be any known motor and is not specifically limited.

The input roller 22 transmits a rotational driving force generated by the motor 21 to the inner ring 3 and is formed in such a shape that two cylinders having different diameters are connected. In addition, the input roller 22 is supported so as to be rotatable about the central axis of the cylinders by the input bearings 23.

The cylinder portion of the input roller 22 that is in contact with the inner ring 3 is formed in a smooth roller shape, and the rotation thereof causes the inner ring 3 to be rotationally driven. In addition, the diameter d of the input roller 22 is smaller than the diameter D1 of the inner circumferential surface 31 of the inner ring 3.

The input bearings 23 support the input roller 22 so as to be rotatable. In addition, the input bearings 23, together with the pressing portion 24, press the input roller 22 against the inner circumferential surface 31 of the inner ring 3, in other words, radially outward of the inner ring 3 (upward in FIG. 1).

The input bearings 23 may be any known bearings and are not specifically limited.

The pressing portion 24, together with the input bearings 23, presses the input roller 22 against the inner circumferential surface 31 of the inner ring 3, presses the inner ring 3 and the cylindrical rollers 4 against each other, and presses the outer ring 6 and the cylindrical rollers 4 against each other (applies a preload to them). Although an example in which a spring is used as the pressing portion 24 is described in this embodiment, it is not specifically limited to a spring.

The inner ring 3 is a member that is formed in a cylindrical shape and is supported so as to be rotatable about the rotation axis L, and, together with the outer ring 6, retains the cylindrical rollers 4. In addition, the inner ring 3 is in contact with the input roller 22 at the inner circumferential surface 31 and is rotationally driven by the input roller 22. At the same time, the inner ring 3 is in contact with the cylindrical rollers 4 at the outer circumferential surface 32 and transmits a rotational driving force to the cylindrical rollers 4.

The inner ring 3 has an inner ring flange 33, an inner ring shaft 34, and an inner ring bearing 35.

The inner ring flange 33 prevents the cylindrical rollers 4 from jumping out from between the inner ring 3 and the outer ring 6. In addition, the inner ring flange 33 is a ring-like plate member protruding toward the outer ring 6 from the end of the outer circumferential surface 32 of the inner ring 3 opposite the motor 21 (the left side in FIG. 1).

The inner ring shaft 34 supports the inner ring 3 and, together with the inner ring bearing 35, supports the inner ring 3 so as to be rotatable. In this embodiment, an example in which the inner ring shaft 34 is formed in a cylindrical shape with a closed end and in which the inner ring 3 is disposed at an end of the wall of the cylinder will be described.

The inner ring bearing 35 supports the inner ring 3 and the inner ring shaft 34 so as to be rotatable about the rotation axis L. Note that the inner ring bearing 35 may be a known bearing and is not specifically limited.

The cylindrical rollers 4 are a plurality of cylindrical members disposed between the inner ring 3 and the outer ring 6 and move over the outer circumferential surface 32 of the inner ring 3 and an inner circumferential surface 61 of the outer ring 6 by rolling. Although FIG. 2 shows an example in which four cylindrical rollers 4 are arranged at equal intervals in the circumferential direction to facilitate understanding, the number of the cylindrical rollers 4 is not limited to four, but may be any number and is not specifically limited.

The retainer 5 retains the cylindrical rollers 4 apart from one another at equal intervals in the circumferential direction such that the cylindrical rollers 4 roll over the outer circumferential surface 32 of the inner ring 3 and the inner circumferential surface 61 of the outer ring 6. In addition, the retainer 5 is a cylindrical member that is disposed between the inner ring 3 and the outer ring 6 and is supported by the output shaft 7 so as to be rotatable about the rotation axis L.

The outer ring 6 is formed in a cylindrical shape and, together with the inner ring 3, retains the cylindrical rollers 4. Unlike the inner ring 3, the outer ring 6 is a member supported so as not to rotate about the rotation axis L. In addition, the outer ring 6 is in contact with the cylindrical rollers 4 at the inner circumferential surface 61, and the cylindrical rollers 4 roll over the inner circumferential surface 61.

The outer ring 6 has a pair of outer ring flanges 62 that prevent the cylindrical rollers 4 from jumping out from between the inner ring 3 and the outer ring 6.

The outer ring flanges 62 are ring-like plate members protruding toward the inner ring 3 from both ends of the inner circumferential surface 61 of the outer ring 6.

The output shaft 7 transmits a rotational driving force reduced in speed by the micro-traction drive 1 to an external device and supports the retainer 5 so as to be rotatable about the rotation axis L. In this embodiment, an example in which the output shaft 7 is formed in a cylindrical shape with a closed end and in which the retainer 5 is disposed at an end of the wall of the cylinder will be described.

The output shaft 7 has an output bearing 71 that supports the output shaft 7 and the retainer 5 so as to be rotatable about the rotation axis L. Note that the output bearing 71 may be a known bearing and is not specifically limited.

Next, the transmission of a rotational driving force of the micro-traction drive 1 having the above-described configuration and the like will be described with reference to FIGS. 1 and 2.

In the micro-traction drive 1 according to this embodiment, the input roller 22 is loaded radially outward (upward in FIGS. 1 and 2) by the pressing portion 24 and is pressed against the inner circumferential surface 31 of the inner ring 3. In addition, the outer circumferential surface 32 of the inner ring 3 and the cylindrical rollers 4 are pressed against each other, and the cylindrical rollers 4 and the inner circumferential surface 61 of the outer ring 6 are pressed against each other. In other words, a preload is applied.

When electric power is supplied to the motor 21 in this state, and the motor 21 generates a rotational driving force, the input roller 22 is rotationally driven. As a result, the inner ring 3 in contact with the circumferential surface of the input roller 22 is rotationally driven by the input roller 22.

The rotation of the inner ring 3 is transmitted to the cylindrical rollers 4, and the cylindrical rollers 4 rotate (revolve) about the inner ring 3 while rolling (turning) over the outer circumferential surface 32 of the inner ring 3 and the inner circumferential surface 61 of the outer ring 6.

The revolution of the cylindrical rollers 4 is transmitted to the output shaft 7 via the retainer 5, causing the output shaft 7 to be rotationally driven.

Now, the reduction ratio of the micro-traction drive 1 according to this embodiment will be described.

The reduction ratio of the micro-traction drive 1 according to this embodiment is given by the expression below, where the diameter of the input roller 22 is d, the diameter of the inner circumferential surface 31 of the inner ring 3 is D1, and the diameter of the inner circumferential surface 61 of the outer ring 6 is D2.

$$(D1/d) \times (D2/D1+1) \qquad \text{Expression 1}$$

This shows the product of the reduction ratio (D2/D1+1) achieved by the inner ring 3, the cylindrical rollers 4, and the outer ring 6 and the reduction ratio (D1/d) achieved by the input roller 22 and the inner ring 3. Accordingly, it is understood that a large reduction ratio can be achieved compared with a traction drive using a roller bearing.

With the above-described configuration, by transmitting a rotational driving force to the inner ring 3 from the input roller 22 disposed adjacent to the inner circumferential surface 31 of the inner ring 3, a large reduction ratio can be achieved even in a traction drive adapted from a roller bearing.

That is, because of the inner ring 3, the cylindrical rollers 4, the retainer 5, and the outer ring 6, a predetermined reduction ratio is achieved by a traction drive adapted from a roller bearing, and a certain reduction ratio is achieved also between the inner ring 3 and the input roller 22. As a result, the micro-traction drive 1 of this embodiment can achieve a large reduction ratio without connecting two roller bearings but by using one roller bearing.

Even if a rotational driving force is transmitted between the input roller 22 and the inner ring 3, noise can be reduced, moreover vibration can be reduced, compared with transmission using gears.

In addition, because the pressing portion presses the input roller 22 against the inner circumferential surface 31 of the inner ring 3, in other words, presses the input roller 22 radially outward of the inner ring 3, slip or the like between the input roller 22 and the inner ring 3 can be prevented. At the same time, slip or the like between the inner ring 3 and the cylindrical rollers 4, as well as between the outer ring 6 and the cylindrical rollers 4, can also be prevented.

In addition, because the micro-traction drive 1 according to this embodiment can be produced using a commercially available cylindrical roller bearing, it can be produced easily and at low cost.

Figure 3:
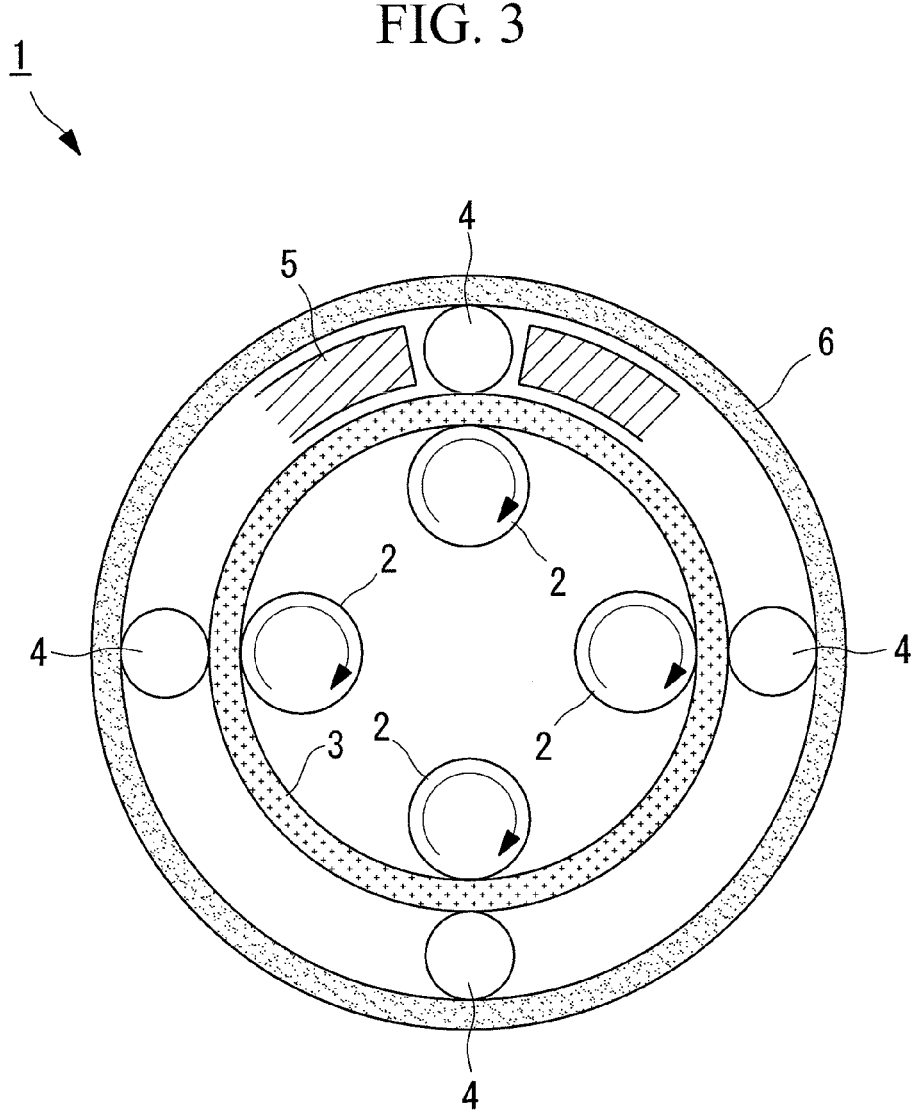
FIG. 3 is a schematic view for describing another example of the micro-traction drive in FIG. 2.

FIG. 3 is a schematic view for describing another example of the micro-traction drive in FIG. 2.

Note that a rotational driving force may be supplied either by disposing one input unit 2 in one micro-traction drive 1, as above, or by disposing a plurality of, for example, four, input units 2, as shown in FIG. 3; it is not specifically limited. At this time, the four input units 2 are preferably disposed at equal intervals in the circumferential direction.

In addition, the micro-traction drive 1 may use either a tapered roller bearing, as above, or a deep groove ball bearing and is not specifically limited.

Second Embodiment

Next, a second embodiment of the present invention will be described with reference to FIGS. 4 and 5.

Although the basic configuration of the micro-traction drive according to this embodiment is the same as that according to the first embodiment, a difference from the first embodiment is present in that the retainer is fixed and the outer ring is connected to the output shaft. Accordingly, in this embodiment, only the retainer, the outer ring, the output shaft, and their vicinity will be described using FIGS. 4 and 5, and descriptions of the other components will be omitted.

Figure 4:
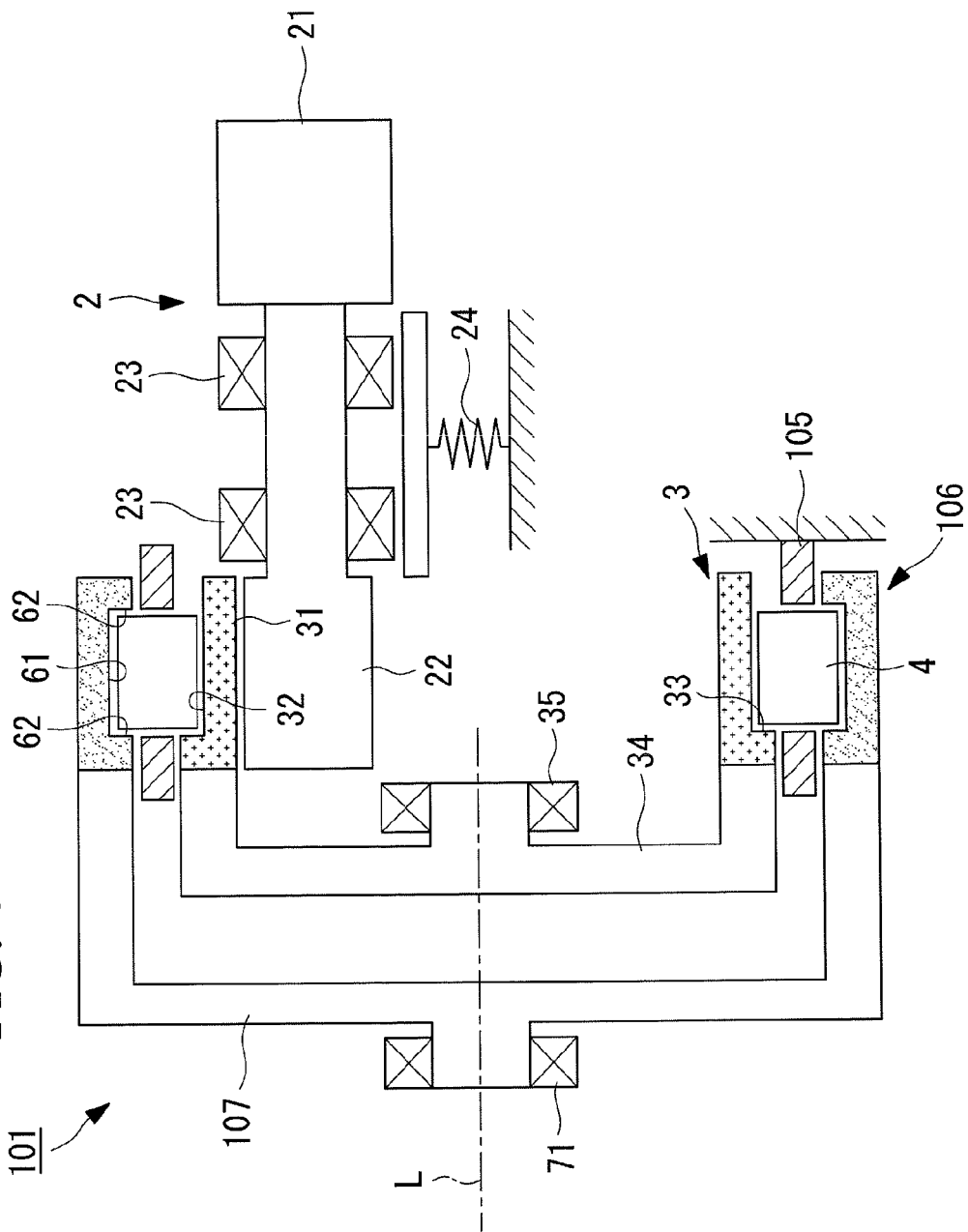
FIG. 4 is a schematic view for describing the configuration of a micro-traction drive according to a second embodiment of the present invention.

FIG. 4 is a schematic view for describing the configuration of a micro-traction drive according to this embodiment. FIG. 5 is a schematic view for describing the movement of the outer ring, the cylindrical roller, the inner ring, and the input roller in FIG. 4.

Note that the same reference signs refer to the same components as those described in the first embodiment, and descriptions thereof will be omitted.

Figure 5:
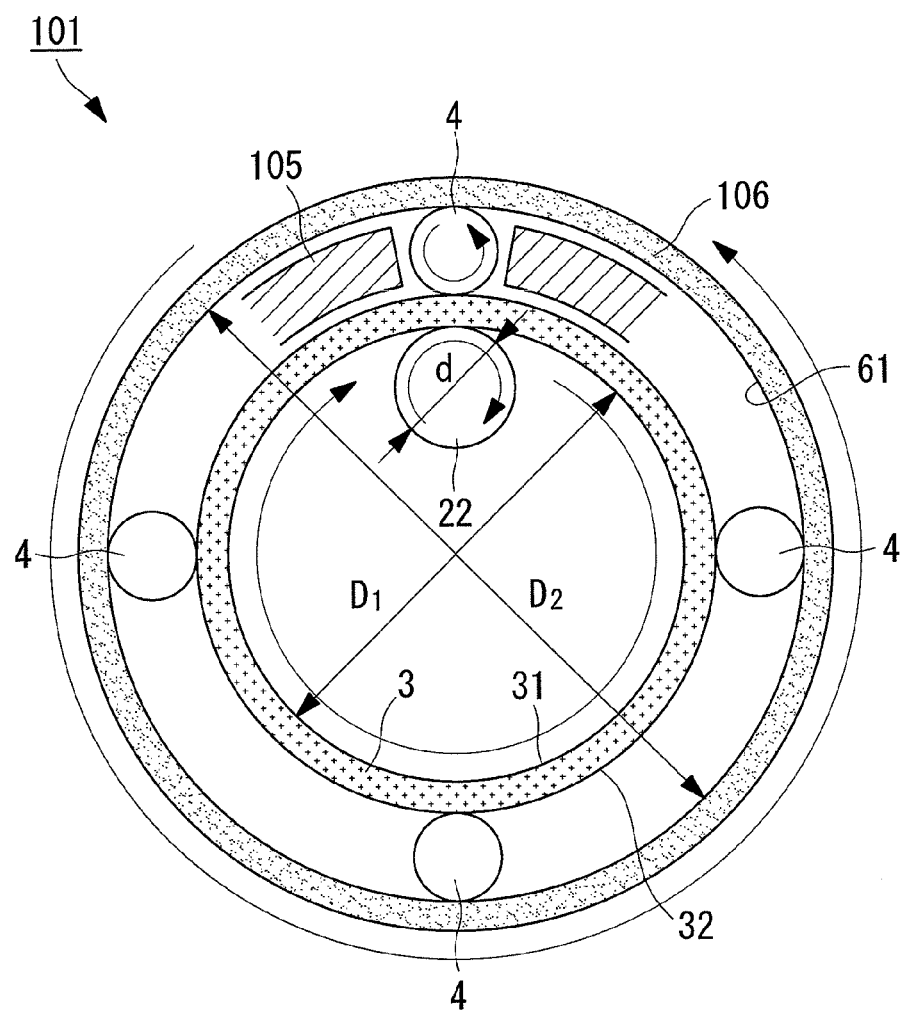
FIG. 5 is a schematic view for describing the movement of the outer ring, the cylindrical roller, the inner ring, and the input roller in FIG. 4.

As shown in FIGS. 4 and 5, a micro-traction drive 101 mainly includes the input unit 2, the inner ring 3, the cylindrical rollers 4, a retainer (retaining portion) 105, an outer ring 106, and an output shaft 107.

The retainer 105 retains the cylindrical rollers 4 apart from one another at equal intervals in the circumferential direction such that the cylindrical rollers 4 roll over the outer circumferential surface 32 of the inner ring 3 and the inner circumferential surface 61 of the outer ring 106. In addition, the retainer 105 is a cylindrical member disposed between the inner ring 3 and the outer ring 6 and, unlike the inner ring 3, is supported so as not to rotate about the rotation axis L.

The outer ring 106 is formed in a cylindrical shape and, together with the inner ring 3, retains the cylindrical rollers 4. The outer ring 106 is supported by the output shaft 107 so as to be rotatable about the rotation axis L.

In addition, the outer ring 106 is in contact with the cylindrical rollers 4 at the inner circumferential surface 61, and the cylindrical rollers 4 roll over the inner circumferential surface 61.

The outer ring 106 has a pair of outer ring flanges 62 that prevent the cylindrical rollers 4 from jumping out from between the inner ring 3 and the outer ring 6.

The outer ring flanges 62 are ring-like plate members protruding toward the inner ring 3 from both ends of the inner circumferential surface 61 of the outer ring 106.

The output shaft 107 transmits a rotational driving force reduced in speed by the micro-traction drive 101 to an external device and supports the retainer 105 so as to be rotatable about the rotation axis L. In this embodiment, an example in which the output shaft 107 is formed in a cylindrical shape with a closed end and in which the outer ring 106 is disposed at an end of the wall of the cylinder will be described.

The output shaft 107 has the output bearing 71 that supports the output shaft 107 and the retainer 105 so as to be rotatable about the rotation axis L. Note that the output bearing 71 may be a known bearing and is not specifically limited.

Next, the transmission of a rotational driving force of the micro-traction drive 101 having the above-described configuration and the like will be described with reference to FIGS. 4 and 5.

When electric power is supplied to the motor 21, and the motor 21 generates a rotational driving force, the input roller 22 is rotationally driven. As a result, the inner ring 3 in contact with the circumferential surface of the input roller 22 is rotationally driven by the input roller 22.

The rotation of the inner ring 3 is transmitted to the cylindrical rollers 4, and the cylindrical rollers 4 roll (turn) over the outer circumferential surface 32 of the inner ring 3 and the inner circumferential surface 61 of the outer ring 106. Because the retainer 105 is fixed, the cylindrical rollers 4 do not rotate (revolve) about the inner ring 3, but turn in place.

The turning of the cylindrical rollers 4 causes the outer ring 106 to rotate in the direction opposite to that of the inner ring 3, as shown by arrows in FIG. 5. The rotation of the outer ring 106 is transmitted to the output shaft 107, causing the output shaft 107 to be rotationally driven.

Now, the reduction ratio of the micro-traction drive 101 according to this embodiment will be described.

The reduction ratio of the micro-traction drive 101 according to this embodiment is given by the expression below, where the diameter of the input roller 22 is d, the diameter of the inner circumferential surface 31 of the inner ring 3 is D1, and the diameter of the inner circumferential surface 61 of the outer ring 106 is D2.

$$(D1/d) \times (D2/D1) = D2/D \quad \{\text{Expression 2}\}$$

This shows that, in the micro-traction drive 101 according to this embodiment, the reduction ratio is determined by the diameter, D2, of the inner circumferential surface 61 of the outer ring 106 and the diameter, d, of the input roller 22. Accordingly, it is understood that a reduction ratio larger than that achieved by the inner ring 3, the cylindrical rollers 4, and the outer ring 6 of (D2/D1+1) can be achieved.

Third Embodiment

Next, a third embodiment of the present invention will be described with reference to FIG. 6.

Although the basic configuration of the micro-traction drive according to this embodiment is the same as that according to the first embodiment, a difference from the first embodiment is present in the configuration of the input roller and the inner ring. Accordingly, in this embodiment, only the input roller and the inner ring will be described using FIG. 6, and descriptions of the other components will be omitted.

Figure 6:
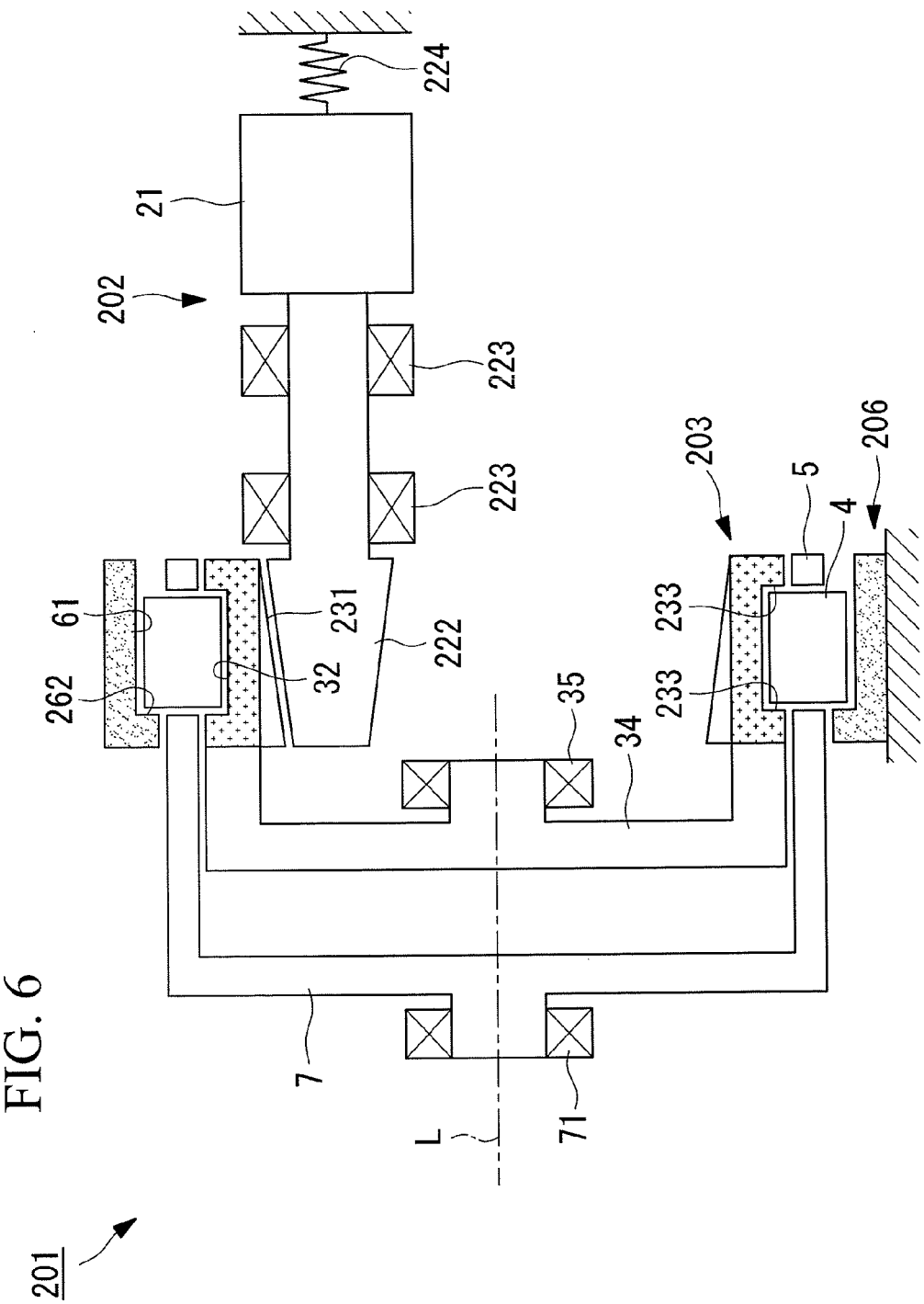
FIG. 6 is a schematic view for describing the configuration of a micro-traction drive according to a third embodiment of the present invention.

FIG. 6 is a schematic view for describing the configuration of a micro-traction drive according to this embodiment.

Note that the same reference signs refer to the same components as those described in the first embodiment, and descriptions thereof will be omitted.

As shown in FIG. 6, a micro-traction drive 201 mainly includes an input unit 202, an inner ring 203, the cylindrical rollers 4, the retainer 5, an outer ring 206, and the output shaft 7.

The input unit 202 inputs a rotational driving force to the inner ring 203 of the micro-traction drive 201 and is disposed adjacent to an inner circumferential surface 231 of the inner ring 203.

The input unit 2 mainly includes the motor 21, an input roller (input shaft) 222, input bearings 223, and a pressing portion 224.

The input roller 222 transmits a rotational driving force generated by the motor 21 to the inner ring 203 and is formed in such a shape that a cylinder and a circular truncated cone are coaxially connected. In addition, the input roller 222, together with the pressing portion 224, applies a preload between the inner ring 203 and the cylindrical rollers 4 and between the cylindrical rollers 4 and the outer ring 206.

The input roller 222 is disposed between the circular truncated cone portion and the motor 21 and is supported by the input bearing 223 such that the cylinder portion is rotatable about the central axis. The circular conical surface of the circular truncated cone portion of the input roller 222 that is in contact with the inner ring 203 is formed in a smooth roller shape, and the rotation thereof causes the inner ring 203 to be rotationally driven. The circular truncated cone portion of the input roller 222 is disposed such that the diameter decreases in the direction away from the motor 21.

The input bearing 223 supports the input roller 222 so as to be rotatable. In addition, the input bearing 223 supports the input roller 222 pressed by the pressing portion 24 such that it can move along its central axis (in the left-right direction in FIG. 6).

The input bearing 223 may be any known bearing and is not specifically limited.

The pressing portion 224 presses the input roller 222 against the inner circumferential surface 231 of the inner ring 203 in the central axis direction of the input roller 222, presses the inner ring 203 and the cylindrical rollers 4 against each other, and presses the outer ring 206 and the cylindrical rollers 4 against each other (applies a preload to them). Although an example in which a spring is used as the pressing portion 224 in this embodiment will be described, it is not specifically limited to a spring.

The inner ring 203 formed in a substantially cylindrical shape is a member supported so as to be rotatable about the rotation axis L and, together with the outer ring 206, retains the cylindrical rollers 4.

The inner ring 203 is in contact with the input roller 222 at the inner circumferential surface 231, which is an inclined surface, and is rotationally driven by the input roller 222. The inner circumferential surface 231 is an inclined surface that extends substantially parallel to the circular conical surface of the circular truncated cone of the input roller 222, in other words, an inclined surface approaching the rotation axis L from the motor 21 toward the inner ring 203. On the other hand, the inner ring 203 is in contact with the cylindrical rollers 4 at the outer circumferential surface 32, which is the circumferential surface around the rotation axis L, and transmits a rotational driving force to the cylindrical rollers 4.

The inner ring 203 includes inner ring flanges 233, the inner ring shaft 34, and the inner ring bearing 35.

The inner ring flanges 233 prevent the cylindrical rollers 4 from jumping out from between the inner ring 203 and the outer ring 206. In addition, the inner ring flanges 233 are ring-like plate members protruding toward the outer ring 206 from both ends of the outer circumferential surface 32 of the inner ring 203.

In particular, the inner ring flange 233 provided on the motor 21 side prevents the cylindrical rollers 4 from jumping out, when a preload is applied to the inner ring 203, the cylindrical rollers 4, and the outer ring 206 using the pressing portion 224.

The outer ring 206 is formed in a cylindrical shape and, together with the inner ring 203, retains the cylindrical rollers 4. Unlike the inner ring 203, the outer ring 206 is a member supported so as not to rotate about the rotation axis L. In addition, the outer ring 206 is in contact with the cylindrical rollers 4 at the inner circumferential surface 61, and the cylindrical rollers 4 roll over the inner circumferential surface 61.

The outer ring 206 has an outer ring flange 262 that prevents the cylindrical rollers 4 from jumping out from between the inner ring 203 and the outer ring 206.

The outer ring flange 262 is a ring-like plate member protruding toward the inner ring 203 from the end of the inner circumferential surface 61 of the outer ring 206 farther from the motor 21 and prevents the cylindrical rollers 4 from jumping out when a preload is applied to the inner ring 203, the cylindrical rollers 4, and the outer ring 206 using the pressing portion 224.

Because the transmission of a rotational driving force in the micro-traction drive 201 having the above-described configuration is the same as that according to the first embodiment, a description thereof will be omitted. Here, a method of applying a preload to the inner ring 203, the cylindrical rollers 4, and the outer ring 206 will be described with reference to FIG. 6.

The input roller 222 pressed by the pressing portion 224 along the central axis of the input roller 222 from the motor 21 toward the inner ring 203 presses the inner circumferential surface 231 of the inner ring 203. Because the inner circumferential surface 231 is an inclined surface, the pressing force exerted by the input roller 222 is transmitted to the inner ring 203 as a force vertically acting on the inner circumferential surface 231. In other words, it is transmitted as a resultant force of a force acting in the radial direction around the rotation axis L (a force acting as a preload) and a force acting in the direction of the rotation axis L.

The force acting in the radial direction acts as a force that generates a preload between the inner ring 203 and the cylindrical rollers 4 and between the cylindrical rollers 4 and the outer ring 206. On the other hand, the force acting in the direction of the rotation axis L is transmitted from the inner ring flanges 233 of the inner ring 203 to outer ring flange 262 of the outer ring 206 fixed to an external member, via the cylindrical rollers 4.

In this manner, in the micro-traction drive 201 according to this embodiment, a preload is applied to the inner ring 203, the cylindrical rollers 4, and the outer ring 206.

With the above-described configuration, the pressing portion 224 presses the input roller 222 along the central axis of the input roller 222 from the motor 21 toward the inner ring 203, in other words, from the large-diameter side toward the smaller diameter side of the circular truncated cone portion. Thus, slip or the like between the input roller 222 and the inner ring 203 can be prevented. At the same time, slip or the like between the inner ring 203 and the cylindrical rollers 4, as well as between the outer ring 206 and the cylindrical rollers 4, can also be prevented.

In addition, compared with transmission using gears, noise can be reduced, moreover vibration can be reduced.

Fourth Embodiment

Next, a fourth embodiment of the present invention will be described with reference to FIG. 7.

Although the basic configuration of the micro-traction drive according to this embodiment is the same as that according to the third embodiment, a difference from the third embodiment is present in that the retainer is fixed and the outer ring is connected to the output shaft. Accordingly, in this embodiment, only the retainer, the outer ring, the output shaft, and their vicinity will be described using FIG. 7, and descriptions of the other components will be omitted.

Figure 7:
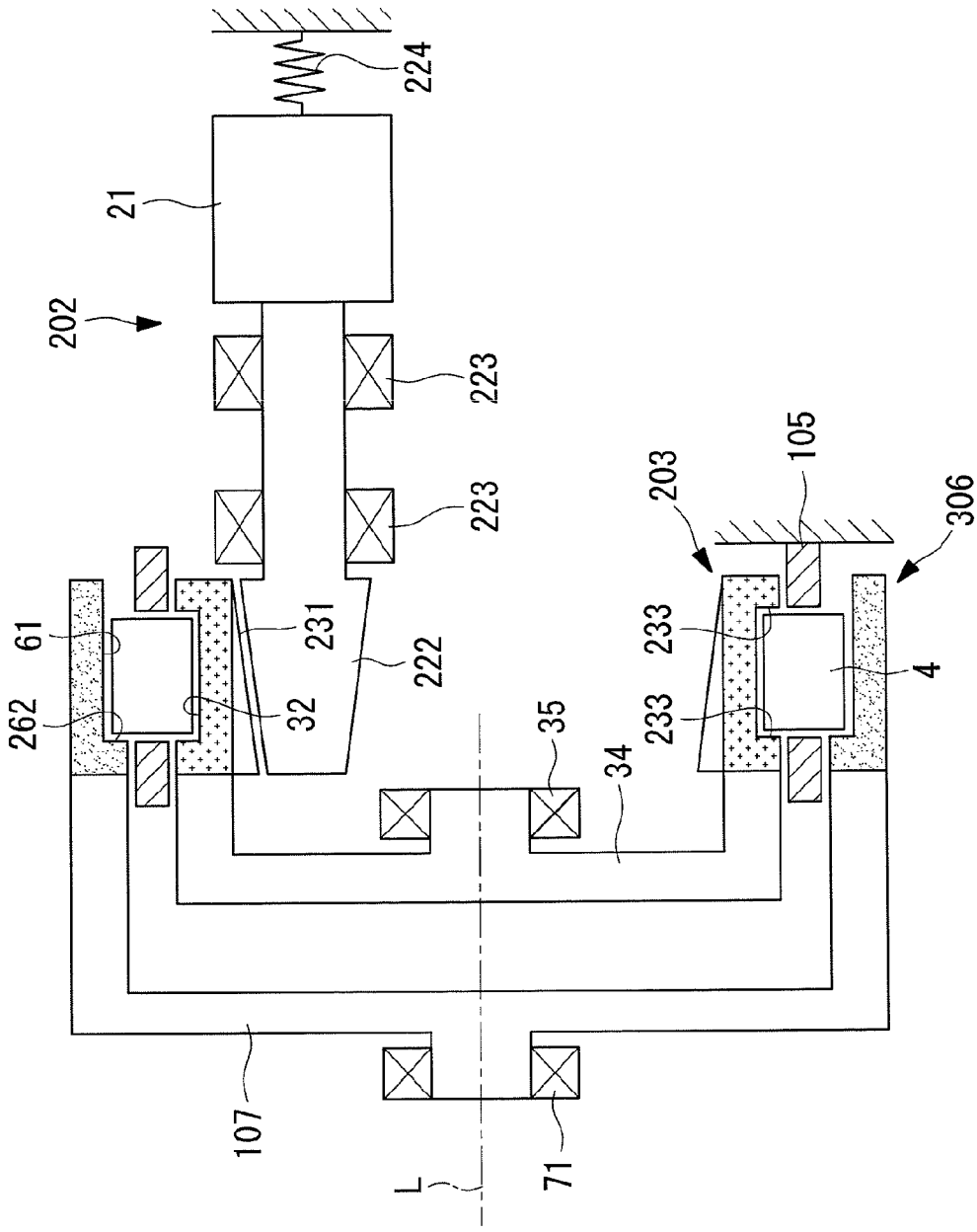
FIG. 7 is a schematic view for describing the configuration of a micro-traction drive according to a fourth embodiment of the present invention.

FIG. 7 is a schematic view for describing the configuration of a micro-traction drive according to this embodiment.

Note that the same reference signs refer to the same components as those described in the third embodiment, and descriptions thereof will be omitted.

As shown in FIG. 7, a micro-traction drive 301 mainly includes the input unit 202, the inner ring 203, the cylindrical rollers 4, the retainer 105, an outer ring 306, and the output shaft 107.

The outer ring 306 is formed in a cylindrical shape and, together with the inner ring 203, retains the cylindrical rollers 4. The outer ring 306 is supported by the output shaft 107 so as to be rotatable about the rotation axis L.

In addition, the outer ring 306 is in contact with the cylindrical rollers 4 at the inner circumferential surface 61, and the cylindrical rollers 4 roll over the inner circumferential surface 61.

The outer ring 306 has the outer ring flange 262 that prevents the cylindrical rollers 4 from jumping out from between the inner ring 203 and the outer ring 306.

The outer ring flange 262 is a ring-like plate member protruding toward the inner ring 3 from the end of the inner circumferential surface 61 of the outer ring 306 farther from the motor 21.

Because the transmission of a rotational driving force in the micro-traction drive 301 having the above-described configuration is the same as that according to the second embodiment, a description thereof will be omitted. Furthermore, because the method of applying a preload to the inner ring 203, the cylindrical rollers 4, and the outer ring 306 is the same as that according to the third embodiment, a description thereof will be omitted.

Fifth Embodiment

Next, a fifth embodiment of the present invention will be described with reference to FIG. 8.

Although the basic configuration of the micro-traction drive according to this embodiment is the same as that according to the third embodiment, a difference from the third embodiment is present in that not a cylindrical roller bearing, but a tapered roller bearing is used in the micro-traction drive. Accordingly, in this embodiment, only the inner ring, rollers, the outer ring, and their vicinity will be described using FIG. 8, and descriptions of the other components will be omitted.

Figure 8:
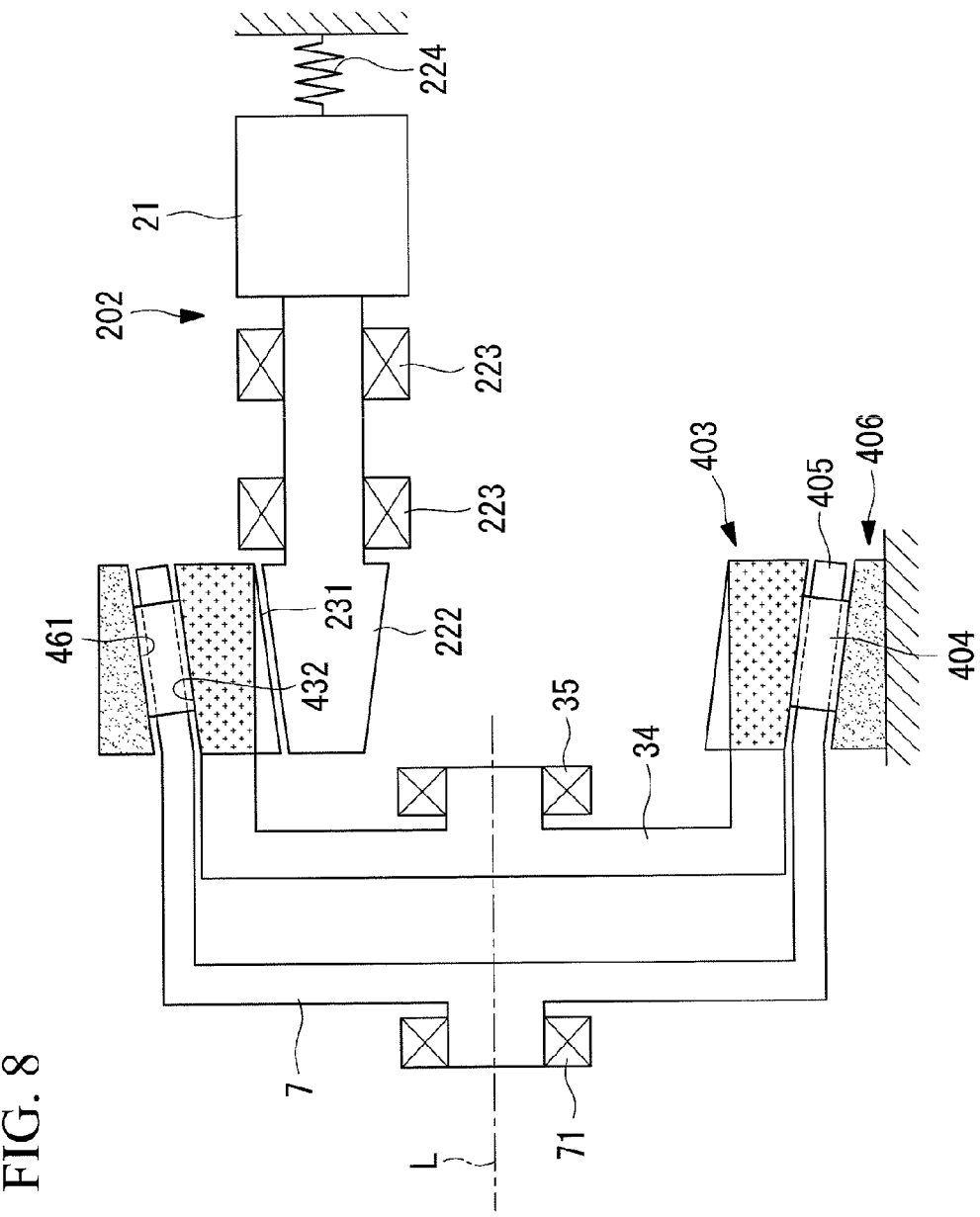
FIG. 8 is a schematic view for describing the configuration of a micro-traction drive according to a fifth embodiment of the present invention.

FIG. 8 is a schematic view for describing the configuration of a micro-traction drive according to this embodiment.

Note that the same reference signs refer to the same components as those described in the third embodiment, and descriptions thereof will be omitted.

As shown in FIG. 8, a micro-traction drive 401 mainly includes the input unit 202, an inner ring 403, tapered rollers (rolling elements) 404, a retainer 405, an outer ring 406, and the output shaft 7.

The inner ring 403 formed in a substantially cylindrical shape is supported so as to be rotatable about the rotation axis L and, together with the outer ring 406, holds the tapered rollers 404.

The inner ring 403 is in contact with the input roller 222 at the inner circumferential surface 231, which is an inclined surface, and is rotationally driven by the input roller 222. The inner circumferential surface 231 is an inclined surface that extends substantially parallel to the circular conical surface of the circular truncated cone of the input roller 222, in other words, an inclined surface approaching the rotation axis L from the motor 21 toward the inner ring 403. On the other hand, the inner ring 403 is in contact with the tapered rollers 404 at the outer circumferential surface 432, which is an inclined surface approaching the rotation axis L from the motor 21 to the inner ring 403, and transmits a rotational driving force to the tapered rollers 404. The inner circumferential surface 231 and the outer circumferential surface 432 are formed so as to be substantially parallel.

The inner ring 403 has the inner ring shaft 34 and the inner ring bearing 35.

The tapered rollers 404 are a plurality of cylindrical members disposed between the inner ring 403 and the outer ring 406 and move over the outer circumferential surface 432 of the inner ring 403 and the inner circumferential surface 461 of the outer ring 406 by rolling.

The retainer 405 holds the tapered rollers 404 apart from one another at equal intervals in the circumferential direction such that the tapered rollers 404 roll over the outer circumferential surface 432 of the inner ring 403 and the inner circumferential surface 461 of the outer ring 406. In addition, the retainer 405 is a cylindrical member that is disposed between the inner ring 403 and the outer ring 406, is inclined toward the rotation axis L from the motor 21 to the inner ring 403, and is supported by the output shaft 7 so as to be rotatable about the rotation axis L.

The outer ring 406 is formed in a substantially cylindrical shape and, together with the inner ring 403, holds the tapered rollers 404. Unlike the inner ring 403, the outer ring 406 is a member supported so as not to rotate about the rotation axis L. In addition, the outer ring 406 is in contact with the tapered rollers 404 at the inner circumferential surface 461, which is an inclined surface approaching the rotation axis L from the motor 21 to the inner ring 403, and the tapered rollers 404 roll over the inner circumferential surface 461. The inner circumferential surface 461 is formed so as to be substantially parallel to the outer circumferential surface 432 of the inner ring 403.

Because the transmission of a rotational driving force in the micro-traction drive 401 having the above-described configuration is the same as that according to the third embodiment, the description will be omitted.

Here, a method of applying a preload to the inner ring 403, the tapered rollers 404, and the outer ring 406 will be described with reference to FIG. 8.

The input roller 222 pressed by the pressing portion 224 along the central axis of the input roller 222 from the motor 21 toward the inner ring 403 presses the inner circumferential surface 231 of the inner ring 203. Because the inner circumferential surface 231 is an inclined surface, the pressing force exerted by the input roller 222 is transmitted to the inner ring 203 as a force vertically acting on the inner circumferential surface 231.

The force acting on the inner ring 403 acts as a force that generates a preload between the outer circumferential surface 432 of the inner ring 403, which is also disposed in an inclined manner, and the tapered rollers 404 and between the tapered rollers 404 and the inner circumferential surface 461 of the outer ring 406.

In this manner, in the micro-traction drive 401 according to this embodiment, a preload is applied to the inner ring 403, the tapered rollers 404, and the outer ring 406.

Sixth Embodiment

Next, a sixth embodiment of the present invention will be described with reference to FIG. 9.

Although the basic configuration of the micro-traction drive according to this embodiment is the same as that according to the fifth embodiment, a difference from the fifth embodiment is present in that the retainer is fixed and the outer ring is connected to the output shaft. Accordingly, in this embodiment, only the retainer, the outer ring, the output shaft, and their vicinity will be described using FIG. 9, and descriptions of the other components will be omitted.

Figure 9:
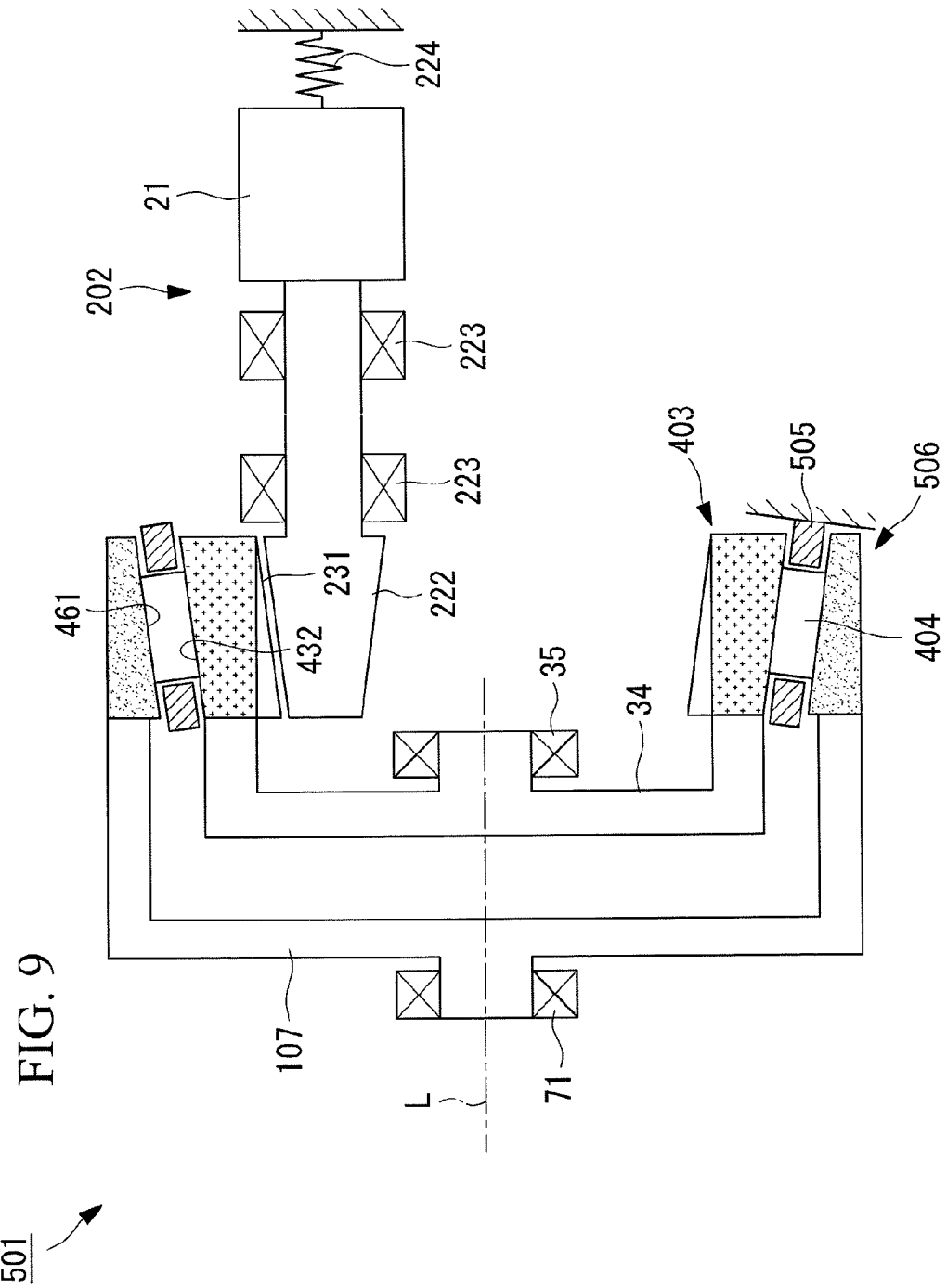
FIG. 9 is a schematic view for describing the configuration of a micro-traction drive according to a sixth embodiment of the present invention.

FIG. 9 is a schematic view for describing the configuration of a micro-traction drive according to this embodiment.

Note that the same reference signs refer to the same components as those described in the fifth embodiment, and descriptions thereof will be omitted.

As shown in FIG. 9, a micro-traction drive 501 mainly includes the input unit 202, the inner ring 403, the tapered rollers 404, a retainer 505, an outer ring 506, and the output shaft 107.

The retainer 505 holds the tapered rollers 404 apart from one another at equal intervals in the circumferential direction such that the tapered rollers 404 roll over the outer circumferential surface 432 of the inner ring 403 and the inner circumferential surface 461 of the outer ring 506. In addition, the retainer 505 is a cylindrical member that is disposed between the inner ring 403 and the outer ring 506, is inclined toward the rotation axis L from the motor 21 to the inner ring 403, and is securely supported.

The outer ring 506 is formed in a substantially cylindrical shape and, together with the inner ring 403, holds the tapered rollers 404. The outer ring 506 is a member supported by the output shaft 107 so as to be rotatable about the rotation axis L. In addition, the outer ring 506 is in contact with the tapered rollers 404 at the inner circumferential surface 461, which is an inclined surface approaching the rotation axis L from the motor 21 to the inner ring 403, and the tapered rollers 404 roll over the inner circumferential surface 461. The inner circumferential surface 461 is formed so as to be substantially parallel to the outer circumferential surface 432 of the inner ring 403.

Because the transmission of a rotational driving force in the micro-traction drive 501 having the above-described configuration is the same as that according to the second embodiment, the description will be omitted. Furthermore, because the method of applying a preload to the inner ring 403, the tapered rollers 404, and the outer ring 506 is the same as that according to the sixth embodiment, a description thereof will be omitted.

Note that the transmission of a rotational driving force between the input roller 222 and the inner ring 403 may be performed by gears; it is not specifically limited. In such a case, it is preferable that the outer ring 506 be pressed in the rotation axis L direction to prevent backlash of the gear portions.

REFERENCE SIGNS LIST 1, 101, 201, 301, 401: micro-traction drive
3, 203, 403: inner ring
4: cylindrical roller (rolling element)
5, 105, 405: retainer (retaining portion)
6, 106, 206, 306, 406: outer ring
7: output shaft
22, 222: input roller (input shaft)
24: pressing portion
404: tapered roller (rolling element)

The invention claimed is:

1. A micro-traction drive comprising:
an inner ring that is formed in a cylindrical shape and is supported so as to be rotatable about a rotation axis;
an outer ring that is formed in a cylindrical shape and has a larger diameter than the inner ring;
a plurality of rolling elements that roll while being in contact with an outer circumferential surface of the inner ring and an inner circumferential surface of the outer ring;
a retaining portion that keeps the plurality of rolling elements apart from one another at predetermined intervals;
a pressing portion that applies a preload between the inner ring and the rolling elements and between the outer ring and the rolling elements; and
an input shaft formed to have a smaller diameter than an inner circumferential surface of the inner ring, the input shaft being disposed adjacent to the inner ring and transmitting a rotational driving force to the inner circumferential surface of the inner ring,
wherein one of the outer ring and the retaining portion is connected to the output shaft, and the other thereof is fixed,
the input shaft is formed in a cylindrical shape having a smaller diameter than the inner circumferential surface of the inner ring,
the inner circumferential surface of the inner ring is formed in a cylindrical surface shape, and
the pressing portion applies a preload between the inner ring and the rolling elements and between the outer ring and the rolling elements by pressing the input shaft against the inner circumferential surface of the inner ring.

2. A micro-traction drive, comprising:
an inner ring that is formed in a cylindrical shape and is supported so as to be rotatable about a rotation axis;
an outer ring that is formed in a cylindrical shape and has a larger diameter than the inner ring;
a plurality of rolling elements that roll while being in contact with an outer circumferential surface of the inner ring and an inner circumferential surface of the outer ring;
a retaining portion that keeps the plurality of rolling elements apart from one another at predetermined intervals;
a pressing portion that applies a preload between the inner ring and the rolling elements and between the outer ring and the rolling elements; and
an input shaft formed to have a smaller diameter than an inner circumferential surface of the inner ring, the input shaft being disposed adjacent to the inner ring and transmitting a rotational driving force to the inner circumferential surface of the inner ring,
wherein one of the outer ring and the retaining portion is connected to the output shaft, and the other thereof is fixed, and wherein
the input shaft is formed in the shape of a circular truncated cone having a smaller diameter than the inner circumferential surface of the inner ring,
the inner circumferential surface of the inner ring is formed in the shape of a circumferential surface of a circular truncated cone, and
the pressing portion applies a preload between the inner ring and the rolling elements and between the outer ring and the rolling elements by pressing the input shaft along the rotation axis of the input shaft from a large-diameter side to a small-diameter side of the circular truncated cone.

* * * * *